US005729552A

United States Patent [19]
Yorimitsu

[11] Patent Number: 5,729,552
[45] Date of Patent: Mar. 17, 1998

[54] PROCESS CONTROL SYSTEM FOR ACTIVATING STORAGE DEVICE

[75] Inventor: Keiichi Yorimitsu, Kawasaki, Japan

[73] Assignee: Fujitsu Limited, Kawasaki, Japan

[21] Appl. No.: 796,954

[22] Filed: Feb. 7, 1997

Related U.S. Application Data

[63] Continuation of Ser. No. 435,082, May 4, 1995, abandoned, which is a continuation of Ser. No. 987,616, Dec. 9, 1992.

[30] Foreign Application Priority Data

Dec. 13, 1991 [JP] Japan .................. 3-330342

[51] Int. Cl.⁶ .................................................. G06F 11/00
[52] U.S. Cl. .............................. 371/21.1; 395/183.12
[58] Field of Search ...................... 371/21.1; 395/183.12

[56] References Cited

U.S. PATENT DOCUMENTS

| | | |
|---|---|---|
| 4,092,732 | 5/1978 | Ouchi . |
| 4,775,978 | 10/1988 | Hartness . |
| 4,817,035 | 3/1989 | Timsit . |
| 4,849,927 | 7/1989 | Vos . |
| 4,888,771 | 12/1989 | Benignus et al. ............ 371/16.1 |
| 5,128,995 | 7/1992 | Arnold et al. ............ 380/4 |
| 5,295,258 | 3/1994 | Jewett et al. ............ 395/575 |

FOREIGN PATENT DOCUMENTS

| | | |
|---|---|---|
| 0426185A2 | 5/1991 | European Pat. Off. . |
| 0450801A2 | 10/1991 | European Pat. Off. . |
| 2118715 | 5/1990 | Japan . |
| 310357 | 1/1991 | Japan . |
| 3240123 | 10/1991 | Japan . |
| WO16711 | 10/1991 | WIPO . |

OTHER PUBLICATIONS

Oyama et al., "F6490 Magnetic Disk Subsystem:DIA", *Fujitsu Scientific & Technical Journal*, vol. 26, No. 4, 1990, Kawasaki, JP, pp. 291-295.

*Primary Examiner*—Vincent P. Canney
*Attorney, Agent, or Firm*—Greer, Burns & Crain, Ltd.

[57] ABSTRACT

A process control system for activating a storage device e.g., disk array device including a plurality of disk drive and control units for operating the disk drives in parallel, executes a background processing while a process for activating the disk array device is being executed. Preferably, when the disk array device is powered on, the apparatus carries out a diagnosis in the respective control units, and applies a locating process to the respective disk drives so as to detect a defective disk drive. If defect is detected, data stored in the defective disk drive is reconstructed in a spare disk drive.

3 Claims, 11 Drawing Sheets

PROCESS CONTROL SYSTEM FOR ACTIVATING STORAGE DEVICE

RELATED APPLICATION

This is a continuation of application Ser. No. 08/435,082, filed on May 4, 1995, now abandoned which is a continuation of co-pending application Ser. No. 07/987,616, filed on Dec. 9, 1992.

BACKGROUND OF THE INVENTION

1. Field of the Invention

The present invention relates to a process control system for activating a storage device such as a disk array device which allows a high speed data transfer to be realized by operating a plurality of magnetic disk drives in parallel and by carrying out data input and data output simultaneously from these disk drives.

There is recently a tendency to demand, in a computer system, a transfer of large amounts of data at high speed, and therefore, an auxiliary storage device is also required to transfer large amounts of data at high speed to exchange data with a host device.

To meet this requirement, an auxiliary storage device, e.g., a magnetic disk array device, has been developed, which is mainly constituted by at least one logical device including a plurality of physical devices such as several units of disk drives, and which enables plural bytes of data to be transferred in parallel between the host device and the logical device.

2. Description of the Related Art

In general, in a single unit of a magnetic disk drive, data transfer speed is limited by a rotation speed of a motor which rotates a magnetic disk as a recording medium. Accordingly, if it is intended to attain high speed operation by increasing a data transfer speed, it is necessary to perform read/write operations in parallel by driving a plurality of disk drives, called a disk array device, simultaneously. At this time, according to a command from a host device, the spindle motors of the magnetic disk drives such as a disk array device connected in parallel with the host device are synchronously rotated, so that it becomes possible to perform a parallel transfer of data.

Further, in addition to the data transfer at high speed, fault tolerance of the whole system is also required for those disk array devices so that sufficient reliability for the large amounts of data can be ensured without decreasing the data transfer speed.

To attain such a fault tolerant system, even though a failure, such as the inability to read data from one disk drive of a plurality of disk drives, has occurred, it is necessary for the disk array device to be constructed so that the data of the failed disk drive can be reconstructed immediately without stopping operation of the whole system of a disk array device.

Some kinds of disk array devices in practical use, in which the above-mentioned data transfer at high speed and the fault tolerance can be satisfied simultaneously, have begun to be announced by various computer manufacturers as the products of disk array devices called RAID (Redundant Arrays of Inexpensive Disks) 1 to RAID5.

Among these RAIDs1-5, RAID3, which is especially adequate for the case where large amounts of data have to be processed continuously at high speed, e.g., scientific calculations, will be described in more detail.

In the RAID3, the disk array device typically includes a plurality of disk drives for data transfer (for example, eight (8) disk drives) and a disk drive for parity checking, all these disk drives operating in parallel simultaneously. In this case, some given parity data corresponding to the parallel data of the respective disk drives for data transfer are previously stored in the disk drive for parity checking (parity disk drive). In such a construction, even though one disk drive of a plurality of disk drives fails so that the data cannot be read out, the data can be reconstructed by reading the parity data from the parity disk drive.

Further, in the RAID3, a spare storage disk drive is also provided. All the data in the failed disk drive is automatically reconstructed and transferred into the spare storage disk drive. If the reconstruction process is completed, the spare storage device can be utilized as a normal disk drive, in cooperation with the other disk drives for data transfer.

In this manner, the disk array device as represented by the RAID3, which enables large amounts of data to be transferred at relatively high speed (for example, 36 MBytes/sec) and has substantially fault tolerant characteristics, can be prepared.

To be more specific, in this disk array system constituted by the disk array device, there are provided a plurality of magnetic disk drives (e.g. eight) for carrying out normal data input/output, a magnetic disk drive for parity data (parity disk drive), and a spare magnetic disk drive (spare disk drive, or hot standby disk drive).

The parity disk drive is adapted to store parity data. For instance, if one of the magnetic disk drives for carrying out the normal data input/output fails and becomes unable to read data stored therein, the lost data can be reconstructed instantaneously from the parity disk drive.

The data stored in the failed disk drive is automatically reconstructed and transferred to the spare disk drive. Upon completion of the data reconstruction, the spare disk drive is used to carry out normal data input/output.

Incidentally, a process has been conventionally executed which detects a fixed error of the respective magnetic disk drives constituting the disk array system, evacuates the content of the failed disk device, and detaches the failed disk drive from the disk array system. However, this processing is executed after, for example, it becomes possible to process on-line in a normal operation.

The above process is executed when a host CPU actually executes a locating, or reading/writing operations to the disk array system, and some error is detected.

More specifically, the host CPU gives a read/write command in order to use the disk array system, but this command ends up in an error. After the command is retried a specified number of times, a data evacuation process and a detaching process (a process of logically detaching the failed disk from the disk array system) are executed.

However, the following problems have existed in the above-mentioned prior art.

(1) The failed disk drive is detected during the normal operation (at the time of on-line processing), which causes the increased overhead time and reduction in the working efficiency of the whole array system constituted by at least one disk array device, as well as reduction in the reliability and the performance.

(2) When a fixed error of the disk drive occurs while the disk array system is being used on-line, processing is required as to evacuate the data onto the spare disk and to detach the failed disk drive.

Thus, due to the above process, the overhead time may be increased and the working efficiency of the whole array system may be reduced. In addition, the reliability of the array system may be reduced.

SUMMARY OF THE INVENTION

Accordingly, an object of the present invention is to provide a process control system for activating a storage device, e.g., at least one disk array device, which enables a failure due to a defective physical device, detected after the storage device is activated, to be avoided.

A further object of the present invention is to provide a process control system for activating the storage device, in which a reliability of the whole array system can be improved and a reduction of working efficiency of the whole array system can be prevented.

A still further object of the present invention is to provide a process control system for activating the storage device, which enables a defective disk drive in the disk array device to be detected and to be removed in advance.

A still further object of the present invention is to provide a process control system for activating the storage device, in which a background process can be executed in advance of the normal operation of the disk array device.

To attain the above objects, the process control system for activating the storage device according to the present invention, including at least one logical device each having a plurality of physical devices, and control units for executing various kinds of controls for the physical devices, is operative to execute a background process of the storage device while a process for activating the storage device is carried out after the storage device is powered on.

Preferably, the system comprises means for preparing a diagnosis of each of the physical devices separately; means for preparing a diagnosis of each of the control units; means for preparing a diagnosis of the logical device in response to a command from a host device; and means for executing the background processing taking into account the result of these diagnosises.

Further, preferably, the diagnosis of the logical device and the background process is executed while an initialization process of the storage device is being carried out.

Further, preferably, the storage device is composed of at least one disk array device including a disk array control unit having a plurality of disk drives, a spare disk drive, and control means for executing various kinds of controls for these disk drives.

More concretely, in the apparatus to which the disk array device is applied, the presence or absence of a defective disk drive is checked in advance by applying a locating process to the respective disk drives in a checking process, and data stored in the defective disk drive is reconstructed in the spare disk drive, in the case where a defective drive is detected.

DESCRIPTION OF THE PREFERRED EMBODIMENTS

Figure 1A:
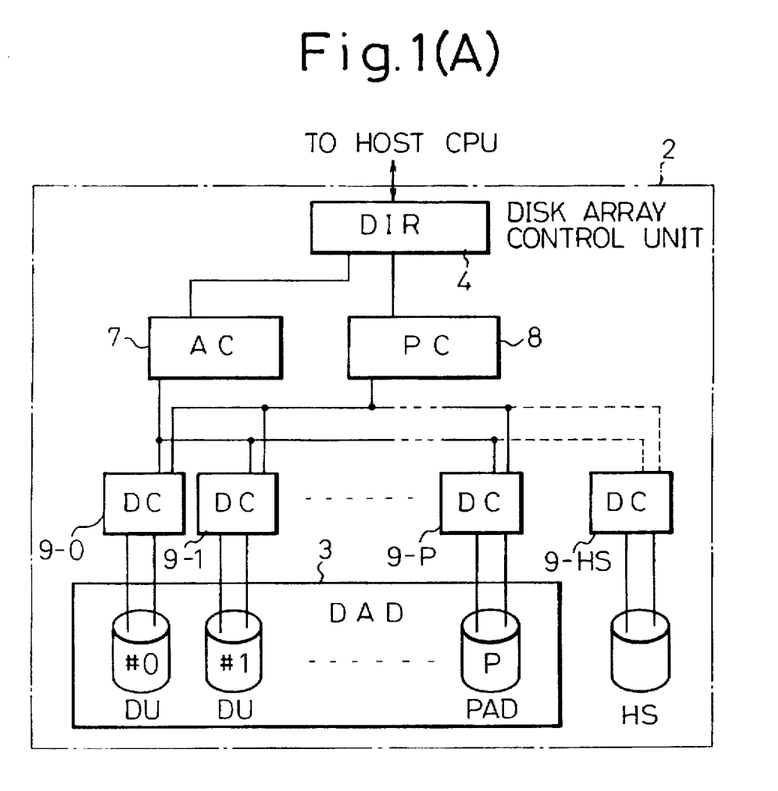
FIGS. 1(A) and 1(B) are a diagram and a flowchart each showing an essential embodiment based on the principle of the present invention.
Figure 1B:
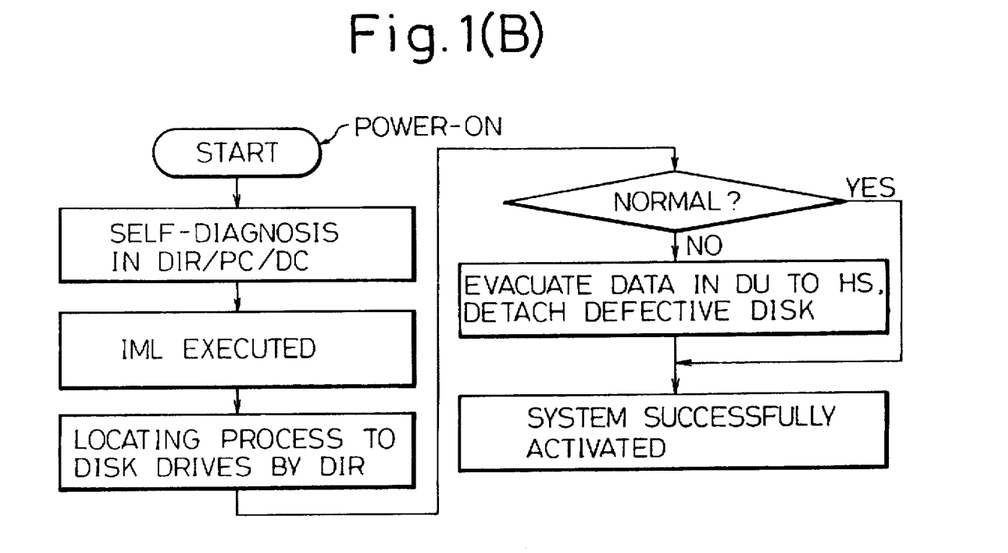

FIGS. 1(A) and 1(B) are a block diagram and a flowchart each showing an essential embodiment based on the principle of the present invention.

In these figures, indicated at 2 is a disk array control unit, at 3 a disk array device (DAD), at 4 a host controller (DIR), at 7 a data transfer control circuit (AC), at 8 a host interface controller (PC), at 9-0, 9-1, . . . 9-P, 9-HS data transfer controllers (DC), at DU a disk drive (a unit of a magnetic disk drive), at PAD a parity disk drive (magnetic disk drives for parity data), and HS a spare disk device (hot standby magnetic disk drive).

In order to overcome the aforementioned problems, the present invention has the following construction.

(1) In a process for activating an array disk system including a disk array device (DAD) 3 having a plurality of disk drives DU, PAD, a spare disk drive HS, and controllers (DIR4, AC7, PCS, DC) for executing various controls for these disk drives, the disk array system controls the plurality of disk devices to operate in parallel and, at the same time, to input or output data. Further, in such a construction, a defect is checked in advance by executing a checking process in the system after the system is powered on, and that the system is activated after the defect is removed in the case where any defect is detected.

(2) In the checking process of the construction (1), the presence or absence of a defective disk drive is checked by applying a locating process or the like to the respective disk devices DU, PAD, and data stored in the defective disk drive is reconstructed in the spare disk drive HS and the system is activated after the defective disk drive is detached from the construction of the disk array device 3, in the case where a defective disk drive is detected.

The operation of the invention based on the above constructions will be described with reference to FIGS. 1(B).

When the disk array system (disk array device) is powered on, a self-diagnosis is first carried out in a host controller (DIR) 4, a data transfer control circuit (AC) 7, a host interface controller (PC) 8, and data transfer controllers (DC) 9-0, 9-1, . . . , 9-P, 9-HS.

If any error is detected at this time, an error indication is displayed. Then, an IML (initial diagnostic microprogram loading) is applied to the respective controllers. Thereafter, the locating process is applied to the respective disk drives in accordance with the control of the host controller 4, and the checking process is executed so as to check whether there exists any defective disk drive.

In the case where an error is detected, the data stored in the defective disk drive (e.g., DU#1) is evacuated into the spare disk drive HS, and the defective disk drive is detached from the construction of the disk array device (DAD) 3.

Upon completion of the above process, the system is activated, thereby beginning a normal operation.

In this way, a defect is detected before activating the system, and the system is activated after reconstructing the disk array device or the like. Accordingly, a failure is less likely to occur during the normal operation of the system and the working efficiency and the reliability of the system can be improved.

Hereinafter, an exemplary embodiment of the invention will be described with reference to the accompanying drawings.

Figure 2:
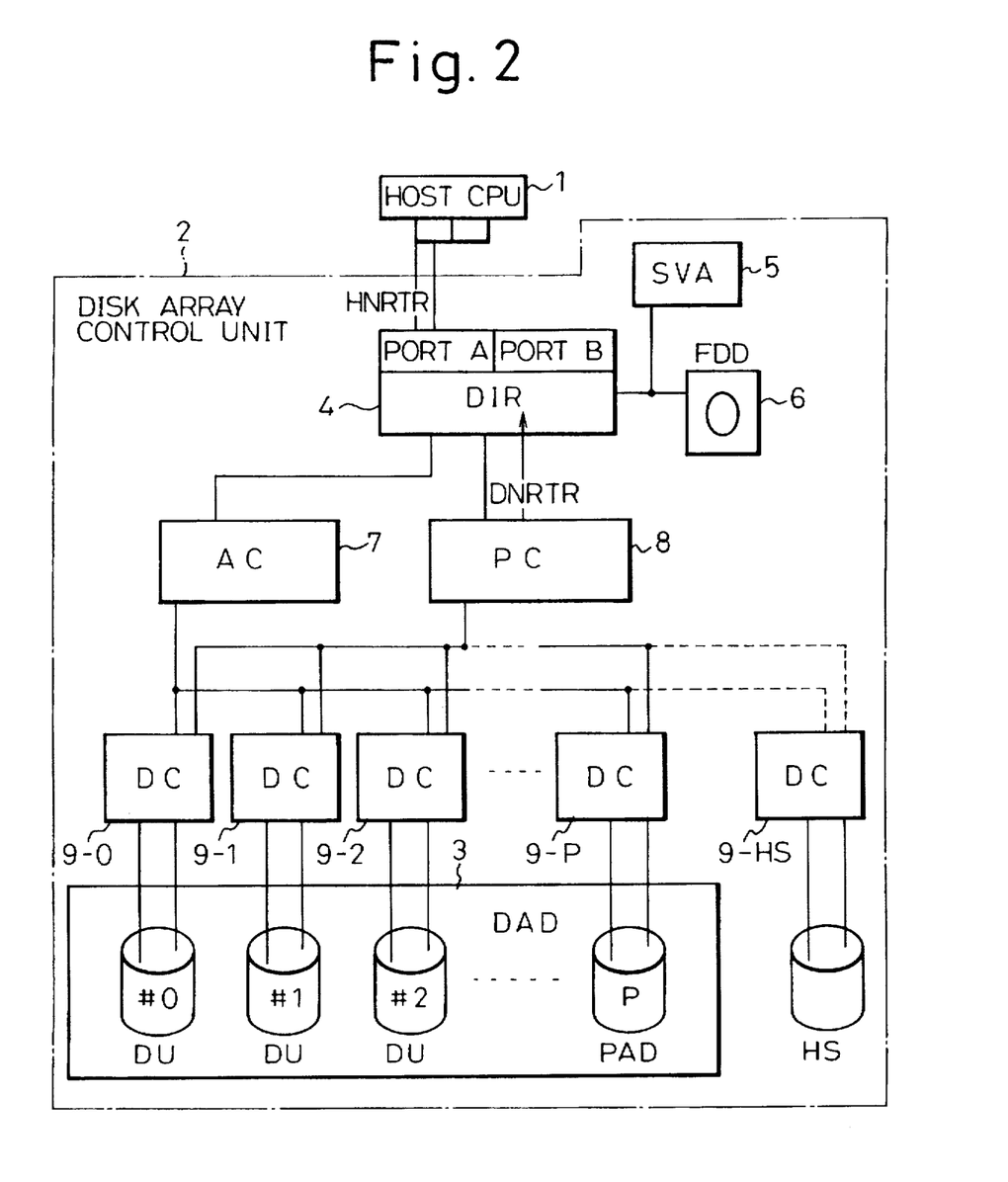
FIG. 2 is a block diagram showing a disk array device in an exemplary embodiment according to the present invention.
Figure 3:
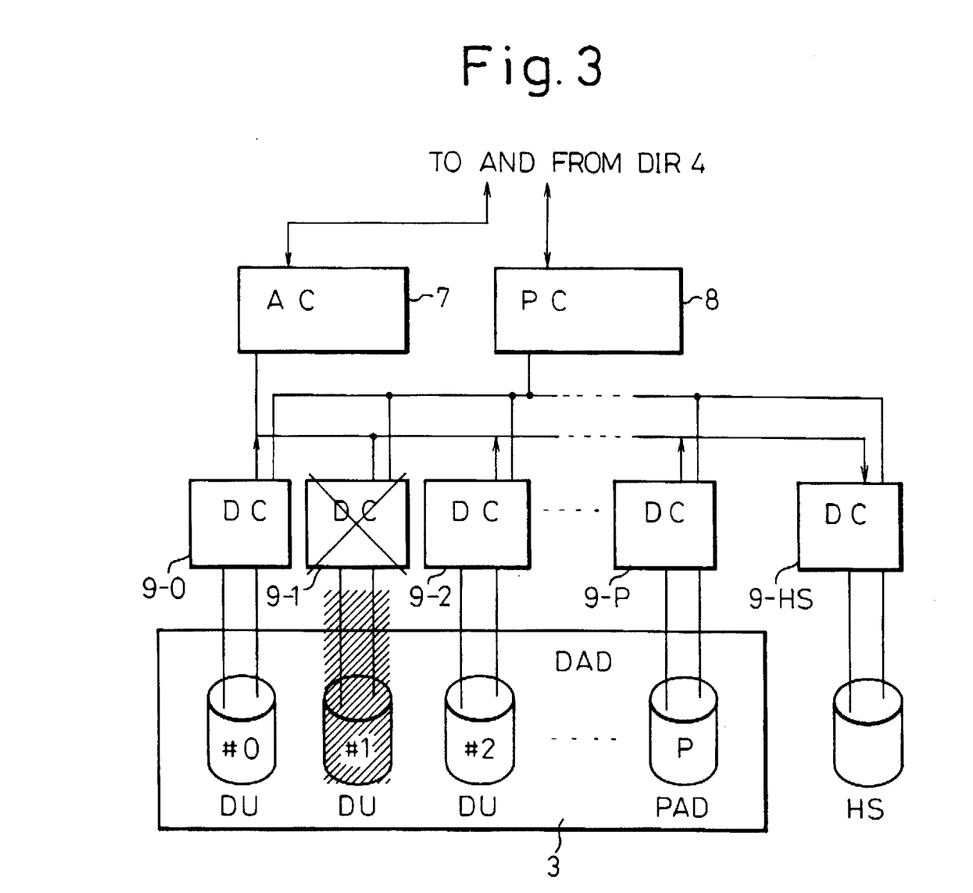
FIG. 3 is a block diagram for explaining a reconstruction processing executed when a defective disk drive is detected.
Figure 4:
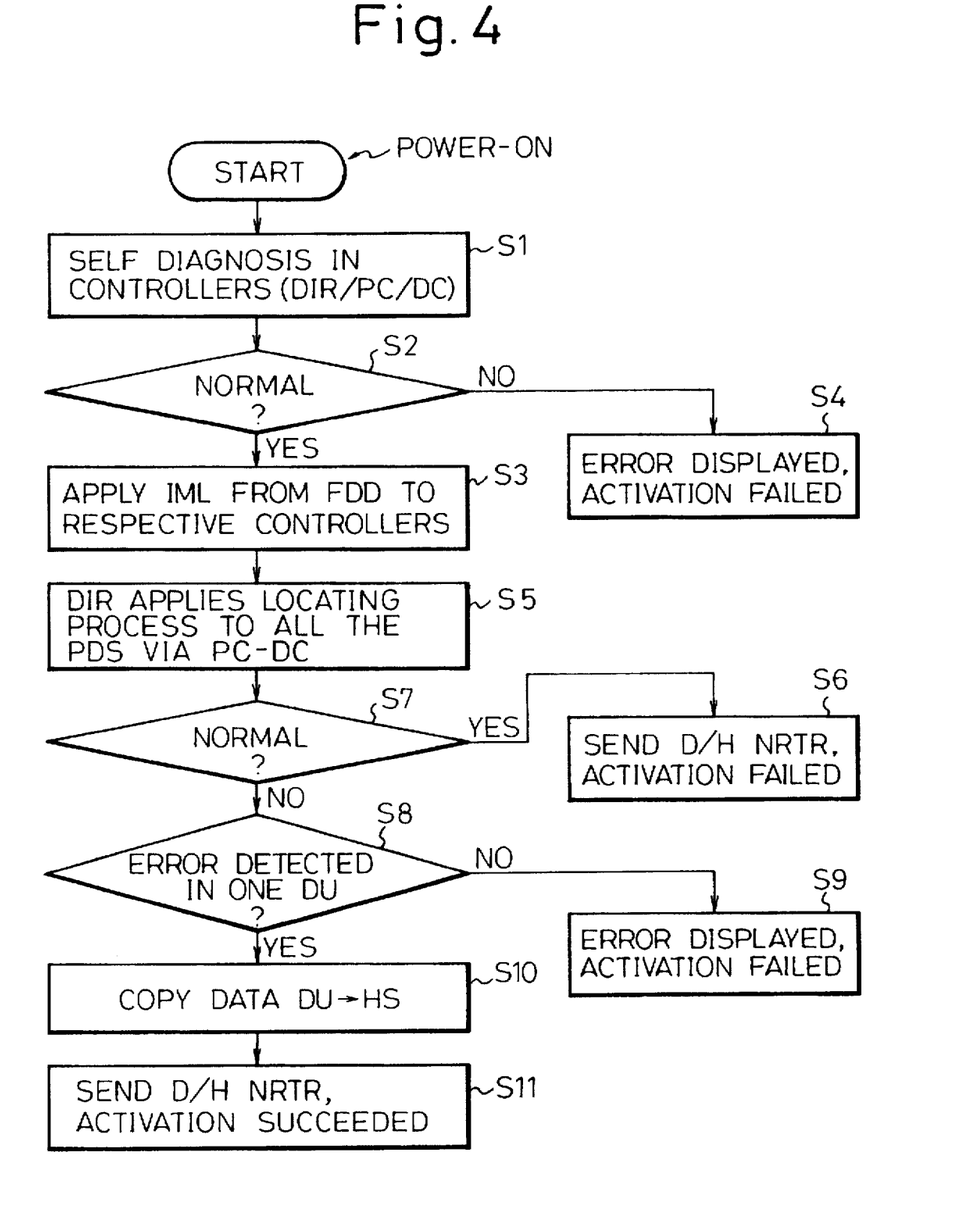
FIG. 4 is a flowchart for explaining a processing of activating the disk array device of FIG. 2.

FIGS. 2 to 4 are diagrams showing an exemplary embodiment according to the present invention. FIG. 2 is a block diagram showing a process control system in a disk array device, FIG. 3 is a block diagram for explaining a reconstruction process executed when a defective disk drive is detected, and FIG. 4 is a flowchart for explaining a processing of activating the disk array device of FIG. 2.

In these figures, like reference numerals designate like parts shown in FIG. 1. Further, indicated at 1 is a host CPU (host device), at 5 a service adapter (SVA), and at 6 a floppy disk (flexible disk) drive.

(1) Description of the array disk system ... see FIGS. 2 and 3.

A construction of the disk array device in this embodiment is shown in FIG. 2. As shown in this figure, the disk array device 2 is connected to the host CPU 1, and constitutes a disk subsystem (magnetic disk subsystem).

In this disk array control unit 2, there are provided a host controller (DIR) 4, the service adapter (SVA) 5, the floppy disk (flexible disk) drive 6, a data transfer control circuit (AC) 7, a host interface controller (PC) 8, data transfer controllers 9-0, 9-1, ..., 9-P, 9-HS (also, generally indicated as 9), a disk array device (DAD) 3, a spare disk drive (hot standby magnetic disk drive) HS, etc.

The host controller (DIR) 4 includes a plurality of ports A and B. For example, the host CPU 1 is connected to the port A.

The disk array device (DAD) 3 includes a plurality of (e.g. eight) disk drives (magnetic disk drives) DU#0 to DU#7, and a parity disk drive (magnetic disk drive for parity data) PAD.

To a plurality of disk drives DU#0 to DU#7 are connected the data transfer controllers 9-0 to 9-7 in an one-to-one correspondence. To the parity disk drive PAD is connected the data transfer controller 9-P.

Further, to the spare disk drive HS is connected the data transfer controller 9-HS. In other words, the disk drives DU, the parity disk drive PAD, and the spare disk drive HS are individually controlled by the data transfer controllers 9-0 to 9-7, 9-P, and 9-HS.

The host interface controller (PC) 8 reconstructs data transferred from the respective disk drives to the respective data transfers controllers (DC), and transfer the data to the host CPU 1 through the host controller 4 (at the time of reading the data).

The host interface controller (PC) 8 also functions as a controller for controlling the data transfer such as distribution of the data transferred through the host controller (DIR) 4 into the respective data transfer controllers (at the time of writing the data), and for sending and receiving control commands to and from the host controller (DIR) 4.

The floppy disk drive (FDD) 6 is adapted to input microcodes to be loaded in memories provided in the respective controllers (DIR, PC, DC, etc.).

The service adapter (SVA) 5 is adapted to execute an IML (initial microprogram loader) for an initialization process and to execute other maintenance processes.

In the disk array device (disk array system) thus constructed, in the case where an unrecoverable hardware failure occurs in one of the disk drive DU, for example, during the on-line operation, the host controller (DIR) 4 informs an error content to the host CPU 1.

Generally, the host CPU 1 retries operation using an alternate path after detecting a hardware failure. However, in the case where an error is detected in the host interface controller (PC) 8 or in the data transfer controllers (DC) 9-1, 9-2, ... despite the retrial repeated several times, the host interface controller 8 determines that the failed disk drive is unusable.

Thereafter, as shown in FIG. 3, the data stored in the disk drive determined to be unusable is generated from the remaining disk drives including the parity disk drive PAD and excluding the failed disk drive, and the generated data is copied into the spare disk drive HS, and the disk array device is reconstructed.

An example of FIG. 3 shows a case where the disk drive DU#1 has failed. In this case, the data stored in the disk drive DU#1 is generated from the respective data stored in the disk drives DU#0, DU#2 to DU#7, and the parity disk drive PAD, and is copied into the spare disk drive HS.

In this way, the disk array device (DAD) 3 is reconstructed. This process can contend with the access from the host CPU 1 to the failed disk drive DU#1. However, these two types of processes cannot be executed simultaneously. In other words, execution of the former process brings about reduction in the access efficiency of the host CPU 1.

In view of the above, according to the present invention, the presence or absence of defect is checked before activating the system. For example, in the case where the disk drive is detected to have a fixed defect in the disk array device, the disk array device is reconstructed as described above.

(2) Description of a processing executed when the system is activated (see FIG. 4).

Hereafter, a system activating process in this embodiment is described with reference to a flowchart shown in FIG. 4. Process steps of FIG. 4 are indicated in parentheses.

When the disk array control unit 2 is powered on, an initial self-diagnostic routine is executed in each of the host controller (DIR) 4, the host interface controller (PC) 8, and the data transfer controllers (DC) 9-0, 9-1, ..., 9-P, 9-HS (S1).

In this case, the self-diagnosis is carried out with the use of initial diagnostic programs stored in non-volatile memories (not shown) provided in the host controller 4, the host interface controller 8, and the data transfer controllers 9-0, 9-1, ..., 9-P, 9-HS, and a program read from the floppy disk drive 6.

If the result of the self-diagnosis indicates that the system is not in a normal state (S2), an error indication is displayed in a display device (not shown) and it is determined that activation of the system has failed (S4).

However, if the result of the self-diagnosis indicates that the system is in a normal state (S2), it is determined that none of the components has a defect, thereby proceeding to a next processing.

In the next processing, a function program is loaded from the floppy disk drive 6 to the host controller 4, the host interface controller 8, the data transfer controllers 9-0, 9-1, ..., 9-P, 9-HS (IML) (S3).

Thereafter, the host controller 4 causes the respective disk drives in the disk array device 3 to rotate (also referred to as spin up) through the host interface controller 8 and the respective data transfer controllers, and reads information stored in each disk drive.

Upon completion of the reading of the information in each disk drive, the respective disk drives are combined and, an interrupt signal (DNRTR) is sent to the host controller 4 so as to inform the controller 4 that the disk drives can be used as one logical device.

Thereafter, the host controller 4 executes a locating process for the disk drive immediately after detecting the interrupt signal (DNRTR) from the host interface controller 8 (S5).

If no error is detected during the locating process, an enabling signal (HNRTR) is sent to the host CPU 1, and thereby the system is successfully activated (S6).

In this case, the host CPU 1 recognizes that the disk array control unit 2 is usable, and makes an access.

However, if some error is detected in the (S5) process (S7), it is determined whether the error is detected in one of the disk drives (S8). If the error is detected in a plurality of disk drives, the error indication is displayed and it is determined that activation of the system has failed (S9).

Further, if the error is detected in one of the disk drives (S8), the reconstruction processing (see FIG. 3) for the disk array device is executed immediately.

In this reconstruction processing, the data stored in the disk drive in which the error is detected is copied into the spare disk drive HS. Upon completion of the copying, the failed disk drive is logically detached (S10).

Thereafter, the host controller 4 sends the enabling signal (HNRTR) to the host CPU 1, and determines that activation of the system has succeeded (S11).

When the system is activated successfully in the above manner, normal operation, e.g. an on-line operation, is started.

Figure 5A:
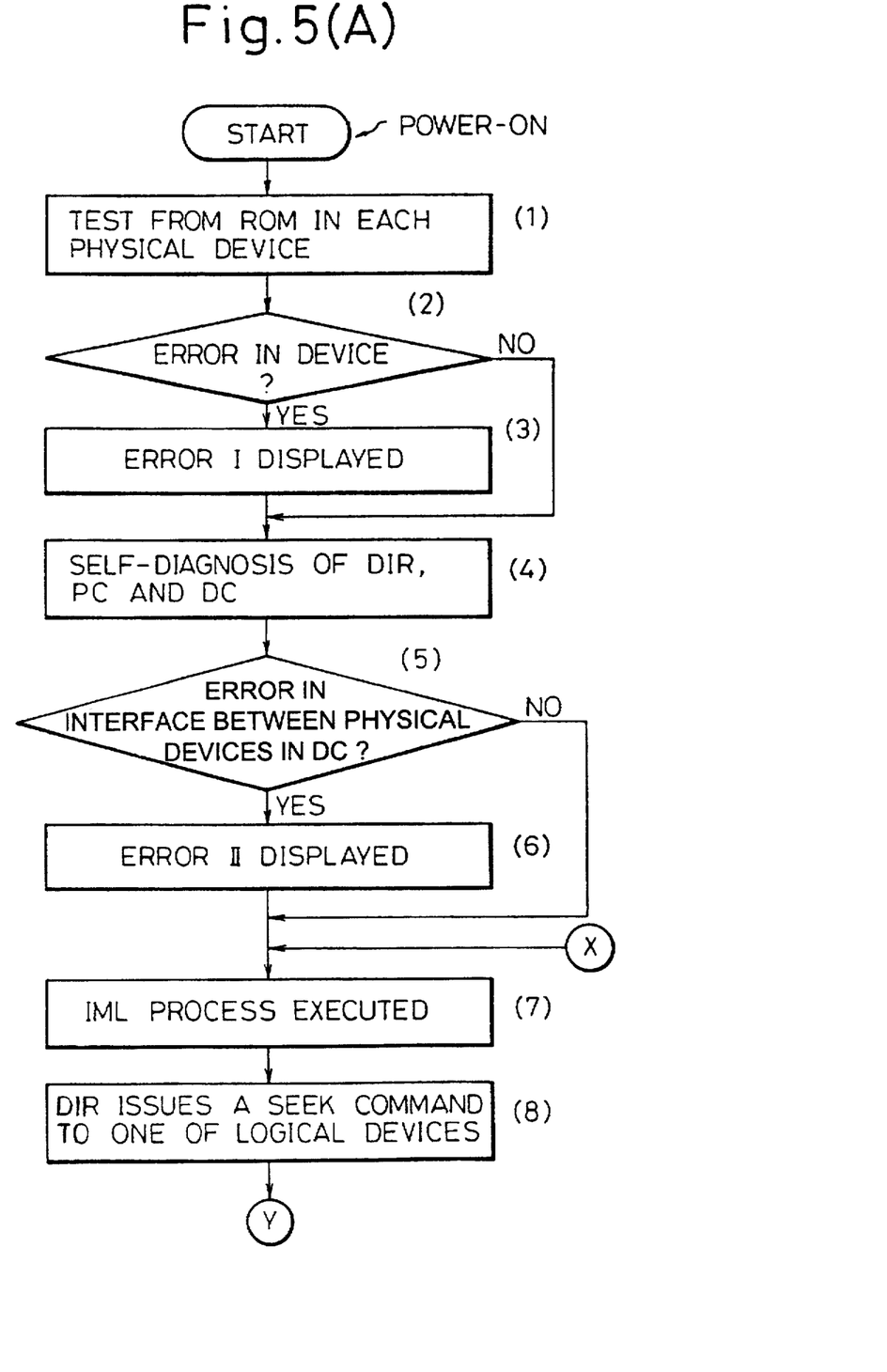
FIGS. 5(A) and 5(B) are flowcharts showing the process of FIG. 4 is more detail.
Figure 5B:
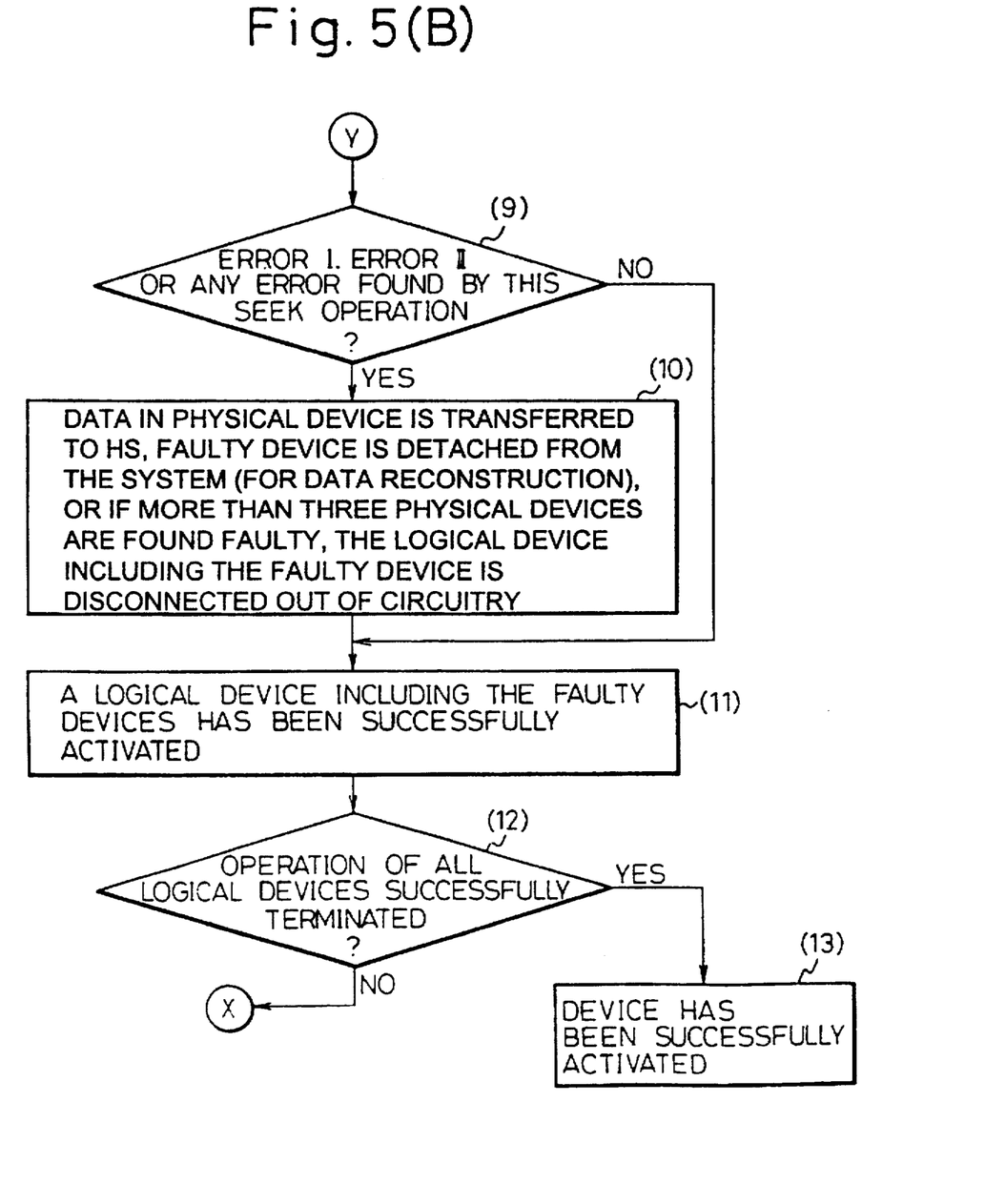

FIGS. 5(A) and 5(B) are flowcharts showing the process of FIG. 4 in more detail.

Here, in order to clarify the difference between the known apparatus and the embodiment of the present invention more firmly, the construction for activating the storage device not utilizing RAID3 will be typically described.

In such a construction, basically, a diagnosis from an ROM in each physical device such as a disk drive (for example, seek test for normal operation checking of a servo head, or the like) is executed when the whole system is powered on (This is indicated a self-diagnosis in DU as in FIG. 1(A)). If the seek has not successfully been completed, the device (disk drive) is basically unusable. Namely, when a subsequent access is made from any host device, the device will inform the host CPU of an error message such as an intervention request, device check, offline, or the like. In this case, the seek test is not executed from a higher level (equivalent to DIR4 as in FIG. 1(A)). (As described above, the diagnosis is basically closed at each module level. Further, even when the best diagnosis is necessary, it is limited to a confirmation of the interface level at most. Namely, it is difficult to control the diagnosis over a plurality of modules, e.g., disk drives. Further, if the diagnosis over the modules or the like is executed incorrectly on any other module already in operation, the system will be adversely affected by the incorrect diagnosis. However, a systematic diagnosis of this kind has been strongly desired to be executed in many cases.)

On the other hand, in the embodiment according to the present invention, a disk array device as represented by RAID3 is utilized. In such a construction, different from the prior art construction, one logical device in the array configuration comprises a plurality of physical devices (disk drives), a plurality of redundant parity devices and a spare device. For controlling these devices, a multiprocessor environment is essentially required, that is composed of such subsystems as DC9 which is a processor for each physical device, PC8 which performs a total control over the DC9s, and DIR4 which interacts with the host CPU1. More particularly, the logical devices are subjected to the diagnoses from ROM and DC9s which are the host processors for the disk drives as in the prior art, and are also subjected to the diagnosis (seek) from DIR4 to make sure that all the physical devices operate normally. Namely, the present invention can take advantage of the preferable characteristics of a disk array device, and therefore the diagnoses can be carried out to a higher level than that of the known construction (prior art) as described above.

Further, in order to facilitate understanding of a sequential operation according to the present invention, the flowcharts as shown in FIGS. 5(A) and 5(B) will be described.

In FIG. 5(A), first, the disk array control unit 2 is powered on. Next, in step (1), a diagnosis from a ROM in each disk drive is executed, and in step (2), it is checked whether or not individual disk drives (physical devices) are faulty. If some fault is found, error message I is displayed [step (3)] and sometimes the diagnostic routine is stopped.

If no fault is found, in step (4), an initial self-diagnostic routine is executed in each of the host controller (DIR) 4, the host interface controller (PC) 8, and the data transfer controllers (DC) 9-0, 9-1, . . . , 9-P, 9-HS.

In this case, the self-diagnosis is carried out with the use of initial diagnostic programs stored in non-volatile memories (not shown) provided in the host controller 4, the host interface controller 8, and the data transfer controllers 9-0, 9-1, . . . , 9-P, 9-HS, and a program read from the floppy disk drive 6.

If the result of the self-diagnosis indicates that some fault is found in the disk array control unit 2 [step(5)], the error message II is displayed at a system level [step (6)] on a display device (not shown) and it is determined that activation of the system has failed.

However, if the result of the self-diagnosis indicates that no fault is found and that the system is in the normal state, it is determined that none of the components has a defect, thereby proceeding to step (7).

In step (7), a function program is loaded from the floppy disk drive 6 to the host controller 4, the host interface controller 8, the data transfer controllers 9-0, 9-1, . . . , 9-P, 9-HS (so-called IML).

Thereafter, in step (8), the host controller (DIR) 4 causes the respective disk drives in the disk array device 3 to rotate through the host interface controller 8 and the respective data transfer controllers, and reads information defined in each disk drive.

Upon completion of the reading of the information defined in each disk drive, the respective disk drives are combined, and an interrupt signal (DNRTR) is sent to the host controller 4 so as to inform the controller 4 that the disk drives can be used as one logic device.

Thereafter, the host controller 4 executes a locating process (so-called seek operation) for the disk drive immediately after detecting the interrupt signal (DNRTR) from the host interface controller 8.

As shown in FIG. 5(B), if no error is detected during the locating process (seek operation) [step (9)], an enabling signal (HNRTR) is sent to the host CPU 1, taking into account the above-mentioned errors, and thereby the one logical device composed of a plurality of physical devices is successfully activated [step (11)].

If any one of the physical devices is found to be faulty, a reconstruction command is given to the logical device including the faulty device, in step (10). (However, if more than three devices are found to be faulty, it is impossible to reconstruct the logical device including such faulty devices because the data in the spare device and parity device cannot be protected. In some cases, even when two devices including HS become faulty, the data can be protected.)

Further, in accordance with the above-mentioned steps, the diagnoses for all the logical devices are executed [step (12)], and finally the whole system including all the disk array devices can be successfully activated.

In FIGS. 2 to FIG. 5(A), an example, in which the present invention is applied to a disk array system utilizing RAID3, has been typically described. However, it should be noted that the present invention is not limited to the disk array system of RAID3 only, and is applicable to the systems of the other RAID (e.g., RAIDs 1, 2, 4 and 5) as well.

As described above, the embodiment according to the present invention demonstrates the following effects.

(1) Since a defect in a defective disk drive or the like is detected before a system is activated, operations such as replacement and maintenance can be carried out at an earlier stage. Accordingly, the reliability of the system can be improved.

(2) The number of errors is reduced during the on-line operation after the system is activated because of the effect of (1). Accordingly, the reliability and the performance of the system will be improved.

(3) In the case where a defective disk drive exists, a replacement process is executed so as to replace the defective disk drive with a spare disk drive before the system is activated. Accordingly, it is not necessary to execute the replacement process during the normal operation.

Thus, the overhead time in the normal operation can be reduced, and reduction in the working efficiency of the system can be prevented.

Figure 6:
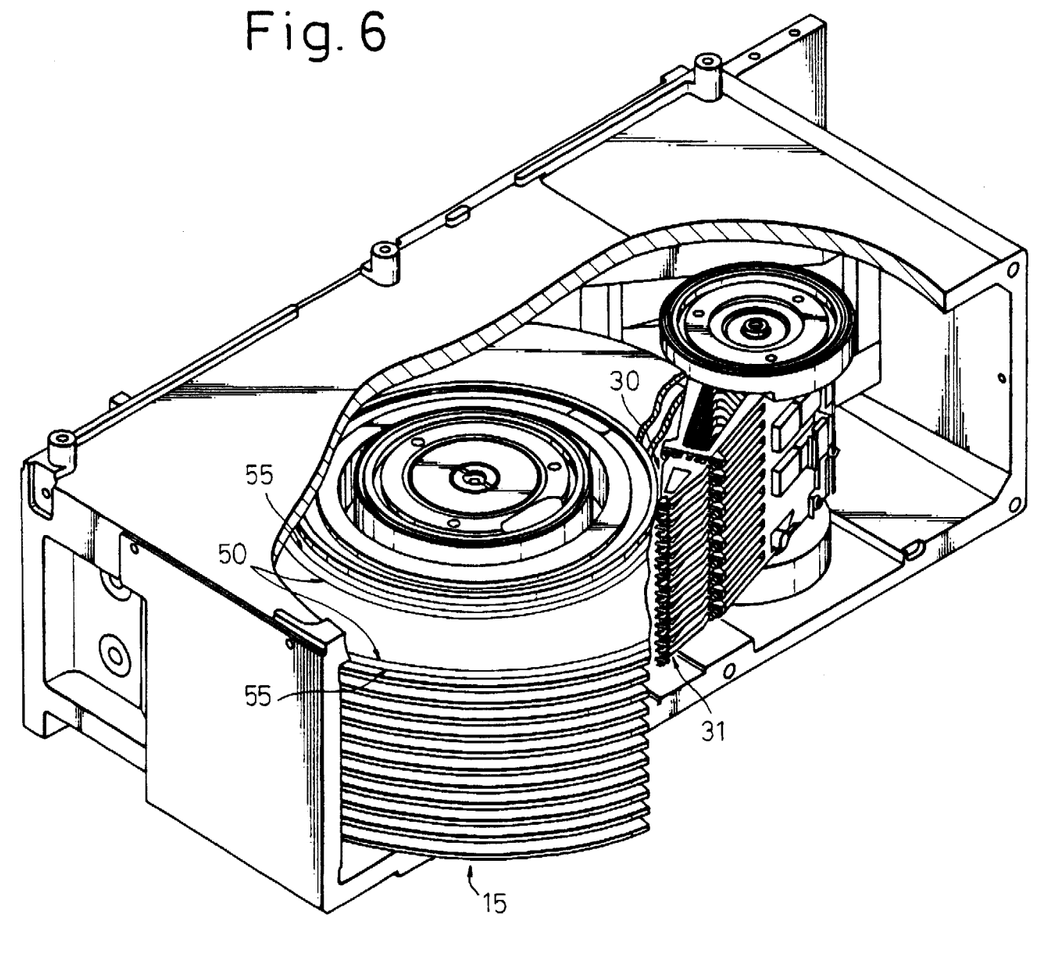
FIG. 6 is a perspective view, partially cut away, showing a mechanism of a magnetic disk drive.

Here, in order to facilitate understanding of the embodiments according to the present invention, a perspective view, partially cut away, showing a mechanism of one magnetic disk drive is illustrated in FIG. 6. As seen from this figure, a plurality of disks (e.g., eleven disks) 15 are rotated simultaneously. The tracks on a recording surface of each disk 15 are written with a predetermined data pattern. However, the tracks at both ends of the inner zone and the outer zone of the disk 15 are formed as guard bands 50 in which a particular pattern is written, instead of a data pattern, which particular pattern is used for stopping a seek operation of two kinds of heads 30 and 31. These heads 30, 31 are provided on the upper and lower surfaces of each disk 15, respectively. Further, at the inner and the outer sides of the guard band 50, an erase zone 55 is formed for mechanically stopping the heads 30 and 31.

Figure 7:
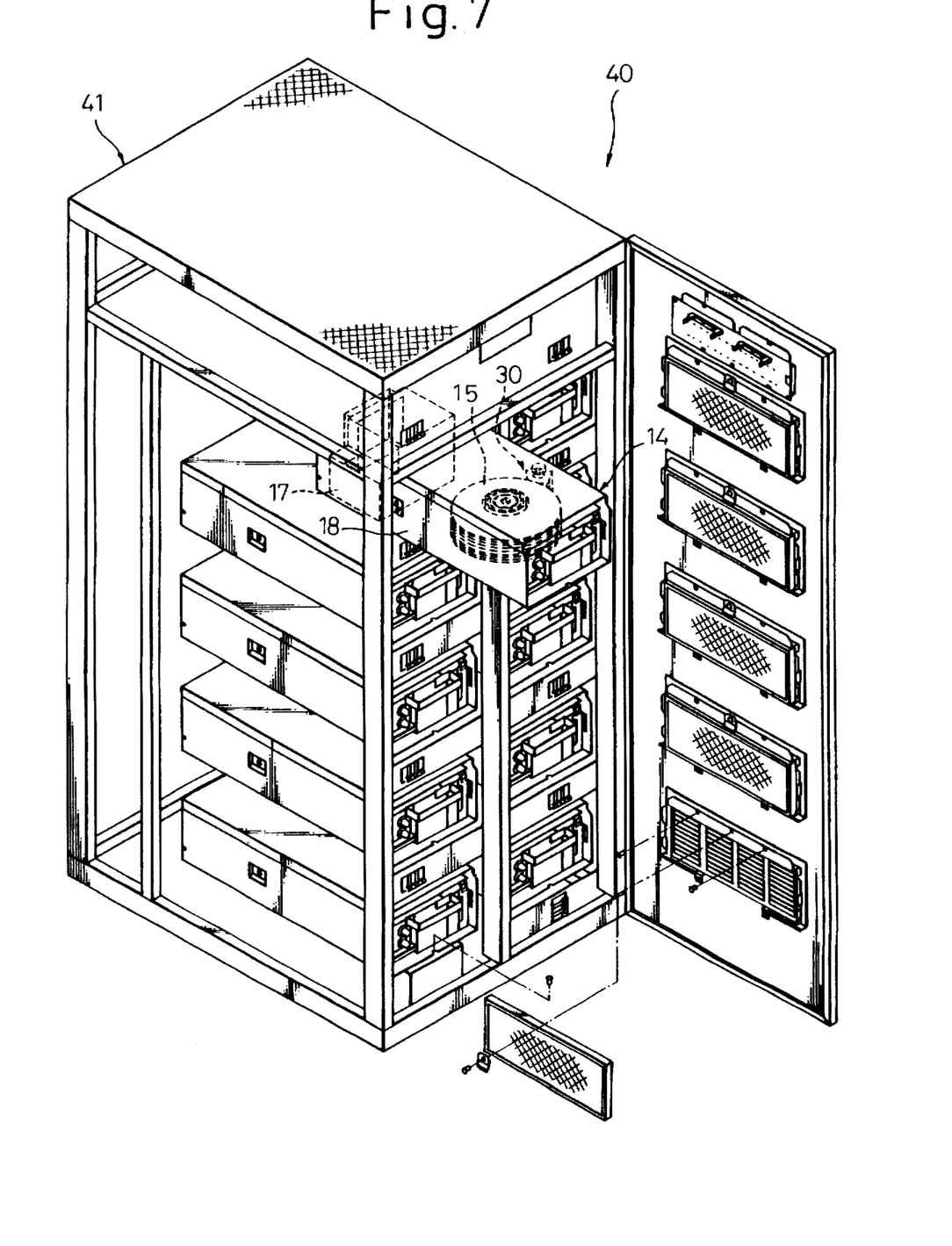
FIG. 7 is a perspective view showing an overall magnetic disk array device.

Preferably, the present invention is adopted to a disk array device 40 as shown in FIG. 7, wherein reference numeral 14 denotes a magnetic disk drive that includes the disks 15 and 41 a housing that can accommodate a plurality of magnetic disk drives. In this case, the disk array device are composed of eight disk drives for data transfer, one parity disk drive and one spare storage disk drive.

The magnetic disk drives 14 constituting each unit of disk array device comprise a disk module 18. The disk module 18 serves to contain the disks 15 and a power supply box 17 inside the disk module 18 per se.

Each magnetic disk drive 14 is constructed to be easily inserted into the housing 41 and also easily removed therefrom, so that a maintenance operation can be rapidly performed when a failure, etc., has occurred.

Figure 8:
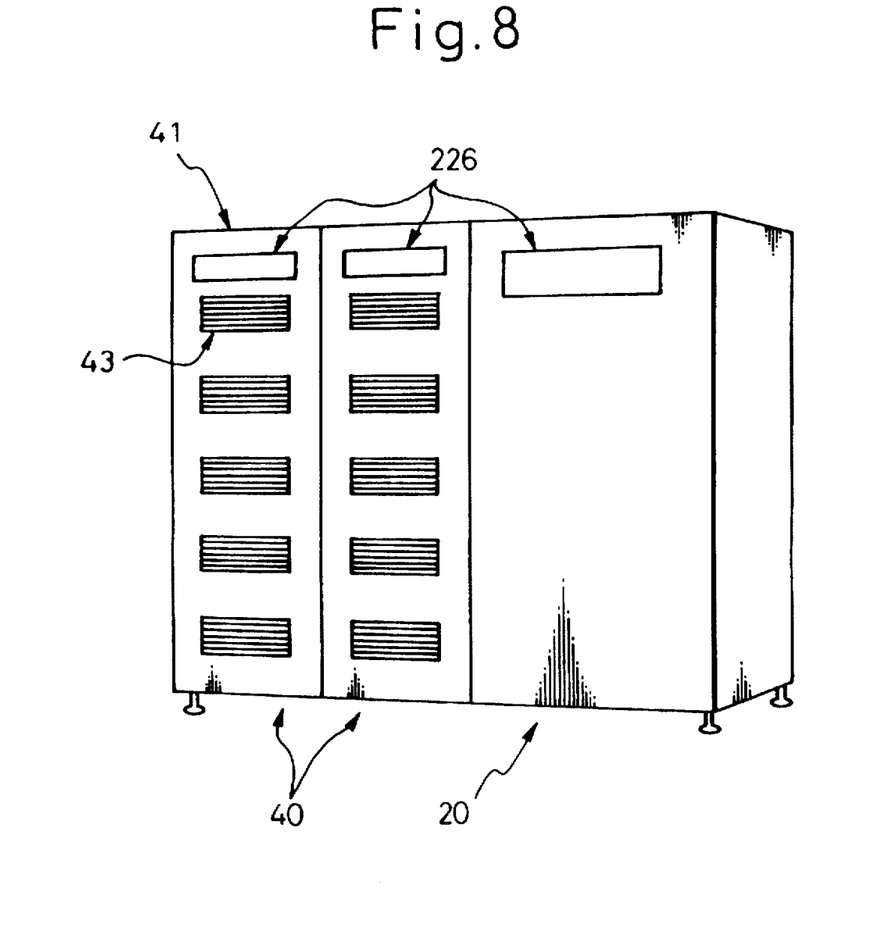
FIG. 8 is a perspective view showing an appearance of a plurality of disk array devices to which the present invention is applied.

Further, in order to clarify the whole construction of a disk array system to which the present invention is applied, an appearance of a plurality of disk array devices including the operation panel 226 is illustrated in FIG. 8.

In FIG. 8, a disk array system is constituted by a plurality of disk array devices, e.g., two disk array devices 40 and a disk array control unit 20 for controlling these disk array devices 40. The two disk array devices 40 and the disk controller is arranged to be contained in a housing 41. In this case, the front side of the housing 41 at each disk array device 40 is provided with the operation panel 226, in addition to a plurality of ventilation windows 43 for radiating heat generated from a plurality of disk drives (not shown in FIG. 8). Further, the front side of the housing 41 at the disk array control unit 20 is also provided with the operation panel 226.

Figure 9A:
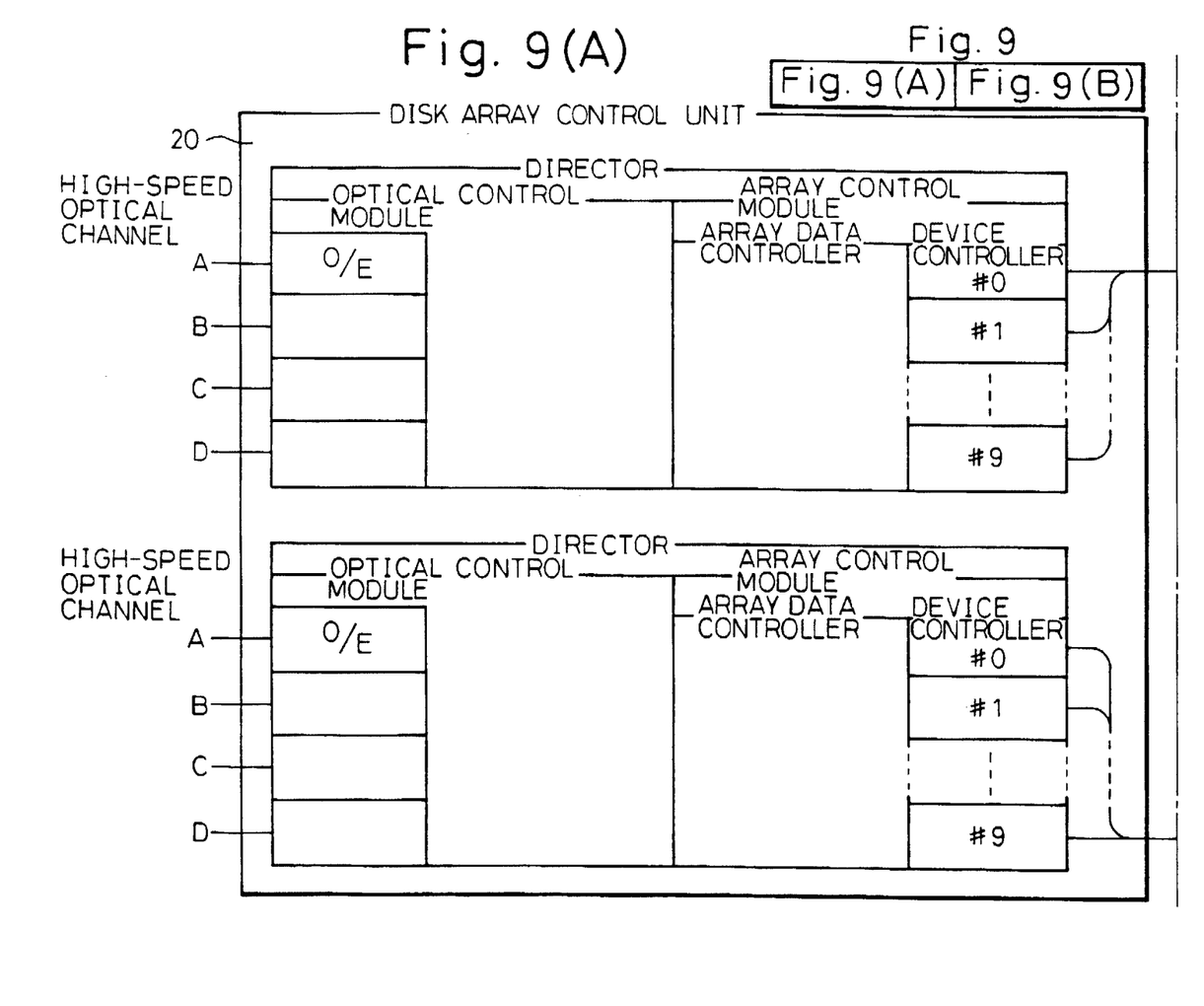
FIGS. 9(A) and 9(B) are block diagrams of a disk controller and the overall disk array devices, respectively.
Figure 9B:
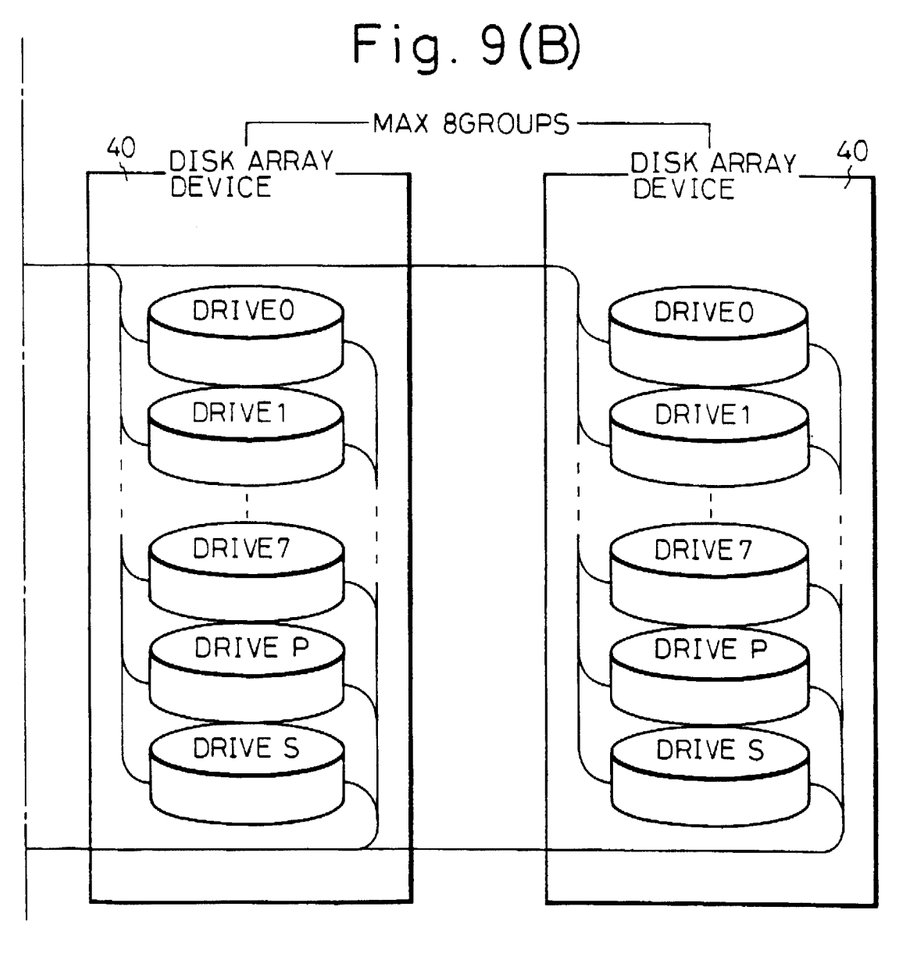

Finally, block diagrams of a disk array control unit 20 and a plurality of disk array devices 40 controlled by the disk array control unit 20 are illustrated in FIGS. 9(A) and 9(B), respectively. In this case, eight disk drives at maximum can be controlled by the disk array control unit 20 having a plurality of directors.

In FIG. 9(A), high-speed optical channels A, B, C and D, and a high-speed optical control module functioning as an optical/electric interface (O/E interface), are provided to enable data to be transferred at high speed between the channel and the disk array devices 40. The disk array control unit 20 consists of two directors. Each director consists of two modules: the optical control module as described above; and an array control module to control the disk array devices 40.

The latter module is divided into ten device controllers to control the respectively corresponding disk drives (Drive 0–7, Drive P and Drive S as shown in FIG. 11(B)) and an array data controller to transfer the data to or from each of the device controllers.

The two directors in the disk array control unit are independent of each other. These directors can control two groups of disk array devices simultaneously.

In this case, the operation panel 226 (FIG. 8) can display the status information of each of two disk array devices.

I claim:

1. An array storage device comprising:
    a plurality of physical devices and a spare physical device;
    distribution means for dividing a data block into a group of sub-data blocks;
    parity means for generating an error correction code as a respectively corresponding additional sub-data block for each group of sub-data blocks, said distribution means respectively storing said group of sub-data blocks and said corresponding additional sub-data blocks on said plurality of physical devices;
    reconstruction means for reconstructing a given sub-data block from said group of sub-data blocks into the spare physical device, when one of said physical devices storing the given sub-data block has failed, using remaining sub-data blocks from said group of sub-data blocks and the respectively corresponding additional sub-data block; and means for executing an activation process during a background operation in said array storage device and for placing said array storage device in an on-line status after said activation process has been successfully completed, wherein said activation process includes a defect location process for moving a head in each of the physical devices to a specific location and determining if a failure occurs in one of said physical devices, and a data reconstruction process by said means for reconstructing the given sub-data block into said spare physical device.

2. An array storage device as set forth in claim 1, wherein said activation process further includes a defect locating process for detecting failures of physical devices from among said plurality of physical devices.

3. An array storage device comprising:

a host;

a plurality of data storage disk drives;

a spare disk drive;

a host controller connected to said host;

a data transfer control circuit connected to said host controller;

a host interface controller connected to said host controller; and a plurality of data transfer controllers each connected to both said data transfer control circuit and said host interface controller, each of said plurality of data transfer controllers controlling data transfer to and from a respective one of said plurality of disk disk drives; wherein said host controller instructs the data transfer control circuit, the host interface controller and the plurality of data transfer controllers to perform a defect locating process for locating defects in the respective disk drives upon power up, and to perform a data reconstructing process when one of said respective disk drives has failed to reconstruct data stored in said one of said respective disk drives to said spare disk drive; and wherein said host controller places said data transfer controllers in an on-line status only after said defect locating process and said data reconstructing process have been completed.

* * * * *